June 14, 1927.
F. J. PECKHAM
FISHING FLOAT
Filed April 17, 1924
1,632,502
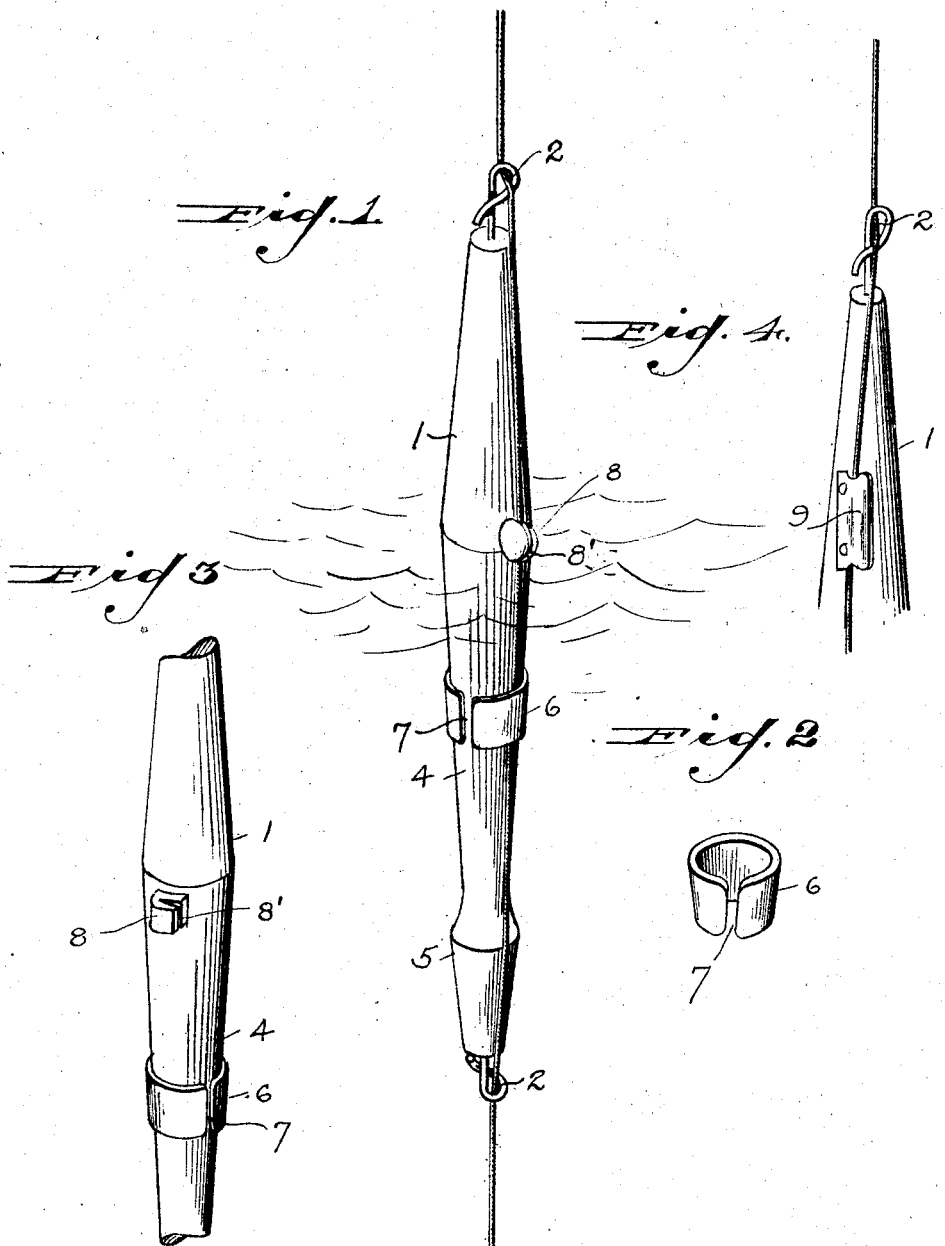

Patented June 14, 1927.

1,632,502

UNITED STATES PATENT OFFICE.

FRANK J. PECKHAM, OF TROY, OHIO.

FISHING FLOAT.

Application filed April 17, 1924. Serial No. 707,118.

This invention relates to floats for fishing lines, and more particularly to means for adjustably holding the line in fixed relation with the float.

In the present invention there is contemplated a float or buoy, having line guides at its opposite ends and an intermediate line gripping portion, by which the line is immovably clamped in relation with the float. Such float and line engaging means being applicable to an intermediate portion of the line, without the necessity of passing the end of the line through such parts. The float consists of an elongated buoyant body having at its ends, a split ring, snap, or "snake" guide, the buoyant body having an intermediate tapered portion, which is slidingly engaged by a split resilient clamping ring. As a modification of this construction there are also shown resilient clamp jaws carried by an intermediate portion of the float in lieu of the split clamp ring. The object of the invention is to simplify the construction as well as the engaging means of such fishing floats, whereby they will not only be cheapened in construction, but will be more efficient in use, positive in operation, easily and quickly constructed, and unlikely to get out of repair.

A further object of the invention is to provide an improved form of open line guide for the ends of the float into which the intermediate portion of the line may be engaged, but from which it may not readily or accidentally escape.

A further and primary object of the invention is to provide intermediate such line guide a suitable form of line clamping device, with which an intermediate portion of the line may be engaged without the necessity of passing the end of the line through such engaging device. The purpose of the device is to provide such clamping means, which may be easily, readily and quickly engaged and disengaged and which will not be likely to become accidentally released.

With the above primary and other incidental objects in view as will more fully appear in the specification, the invention consists of the features of construction, the parts and combinations thereof, and the mode of operation or their equivalents as hereinafter described and set forth in the claims.

Referring to the accompanying drawings, wherein is shown the preferred, but obviously not necessarily the only form of embodiment of the invention, Fig. 1 is a perspective view of the fishing float forming the subject matter hereof and embodying the present invention. Fig. 2 is a detail perspective view of the resilient split clamp member removed from the float or buoy. Fig. 3 is a perspective view of a modification of the clamping member or line gripping device. Fig. 4 illustrates a further modification.

Like parts are indicated by similar characters of reference throughout the several views.

Referring to the accompanying drawings, 1 is the buoyant body or float of elongated form having at its opposite ends line guides 2. These line guides 2 consist of a length of spring wire, one end of which is embedded in the bouyant body or float 1. The spring wire is bent upon itself to form an eye 2, with the free end of the wire extending transversely of the standing portion beyond which it is bent toward the float. This transversely bent free end of the wire is under sufficient tension to cause it to bear closely and tightly to the standing portion of the guide, thereby forming a normally closed eye. The line may be entered into this eye by engaging it beneath the inturned free end of the guide wire and drawing it into the eye against the inherent tension of the guide by springing the transverse portion of the guide wire away from the standing portion. The eye or guide loop 2 lies substantially in the plane of the axis of the float, so that the line when drawn tight is given a slight deflection. The intermediate portion of the buoyant body or float 1 is tapered rather acutely as indicated at 4, which taper terminates in a slight enlargement or head 5 contiguous to its smaller diameter. Surrounding tapered portion 4 of the float and slidingly adjustable thereon in an axial direction is a split resilient tapered collar 6. This split resilient tapered collar 6 when forced upwardly upon the tapered portion 4, affords a secure gripping or clamping action upon the float, and upon the intermediate portion of the line, which is entered through the split 7 of the collar into position intermediate the collar and the float. The tapered contour of the float affords a wedging action tending to expand the resilient split collar placing it under tension. The intermediate portion of the line having been introduced between the collar and the float while the collar loosely surrounds the smaller portion of the tapered section, is clamped and securely held by the wedging action of the tapered float body, within the collar. The enlargement or head 5 of the float limits the sliding adjustment of the collar 6 and prevents its disengagement entirely from the float. When adjusted to a position in proximity to the head or enlargement 5, the grip collar is quite loose upon the float permitting easy and ready introduction of the line through the split 7 into position between the collar and float body. As an auxiliary gripping device, supplemental to the collar or which in fact might be employed in lieu thereof, there is shown a boss 8, preferably of material possessing more or less resilient characteristics, which boss protrudes laterally from the float body 1, at a medial point. Like the split collar this boss is likewise split or slotted in a direction longitudinal in relation with the float to afford two gripper jaws between which the line may be engaged. The slot 8' is preferably somewhat divergent to enable the easy introduction of the line. The boss 8 may be formed integral with the float body, or may be of different material secured thereto. In any event it is a clamping member, detachably engaging the line at a medial point as does the clamp collar 6.

In the modification, Fig. 3, the entrance slot to the line engaging boss or jaws 8 is laterally directed, whereas in Fig. 1 such entrance slot is shown radially disposed. By cutting the entrance slot to the boss or gripper jaws laterally as in Fig. 3, the line may be more easily engaged and is less likely to become accidentally disengaged.

In Fig. 4 the auxiliary clamp member consists of a flexible plate secured to the float. The line is laterally introduced beneath the plate and held by the inherent tension of the plate. This clamp plate is employed in conjunction with the split collar 6 or as a substitute therefor.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific details shown, but that the means and construction herein disclosed comprises the preferred form of several modes of putting the invention into effect and the invention is therefore, claimed in any of its forms or modifications within the legitimate and valid scope of the appended claims.

Having thus described my invention, I claim:

1. In a fishing float, an elongated buoyant body tapered throughout a portion of its length, line guides at its opposite ends, a split spring tapered collar slidingly engaging and conforming to the tapered portion of the body through which the line is passed, the line being clamped in different positions of adjustment by the contraction of the split collar which is placed under tension by the wedging action of the tapered portion of the float, and an enlarged head at the smaller diameter of the tapered portion to insure engagement of the collar and body.

2. In a fishing float, a tapered buoyant body having line guides thereon through which the line is adjustable, a split spring collar surrounding the buoyant body and tapered interiorily to conform to such tapered buoyant body under which the line is inserted through the split of the collar and by which the line is clamped in various positions of adjustment by the inherent tension of the collar and means to prevent removal of the collar from the buoyant body.

3. In a fishing float, a buoyant body having a tapered portion, a split tapered collar slidingly adjustable lengthwise upon the tapered portion to clamp a portion of the line introduced through the split in the collar by the wedging action of the tapered portion of the body and means to limit the sliding adjustment of the collar.

4. A fishing float comprising a buoyant body having a tapered portion at a medial point, a clamping element encircling the tapered portion and longitudinally adjustable thereon, the tapered portion terminating in an enlarged head to retain the clamping element on the tapered portion.

In testimony whereof, I have hereunto set my hand this 14th day of April A. D. 1924.

FRANK J. PECKHAM.